United States Patent [19]

Gomi et al.

[11] Patent Number: 5,794,036
[45] Date of Patent: Aug. 11, 1998

[54] PERIODIC PROCESS LOAD CONTROL SYSTEM AND PERIODIC PROCESS RECORDING MEDIUM

[75] Inventors: Toshiaki Gomi; Masatomo Yazaki; Toshiyuki Fukuoka; Masahide Noda; Koichi Murakami, all of Kawasaki, Japan

[73] Assignee: Fujitsu Limited, Kawasaki, Japan

[21] Appl. No.: 858,499

[22] Filed: May 19, 1997

[30] Foreign Application Priority Data

Dec. 5, 1996 [JP] Japan ................. 8-325421

[51] Int. Cl.$^6$ ................................ G06F 9/00
[52] U.S. Cl. ........................ 395/675; 395/555
[58] Field of Search ..................... 395/675, 672, 395/555

[56] References Cited

U.S. PATENT DOCUMENTS 5,276,898  1/1994  Kiel et al. ....................... 395/675
5,475,844  12/1995  Shiramiza et al. ................. 395/674

Primary Examiner—Parshotam S. Lall
Assistant Examiner—Kenneth R. Coulter
Attorney, Agent, or Firm—Staas & Halsey

[57] ABSTRACT

There is provided a periodic process load control system for controlling a load of a CPU in conjunction with an execution of a periodic process in a multiple-process operating system having the CPU in which a plurality of processes including a periodic process activated periodically are executed on a time division basis, and a periodic process recording medium for storing a periodic process into which such a load control function is incorporated. A time interval in which the periodic process is repeatedly executed is measured to evaluate a load evaluation value consisting of an accumulation value of the time intervals. A load of the periodic process itself is controlled in accordance with the load evaluation value.

5 Claims, 16 Drawing Sheets

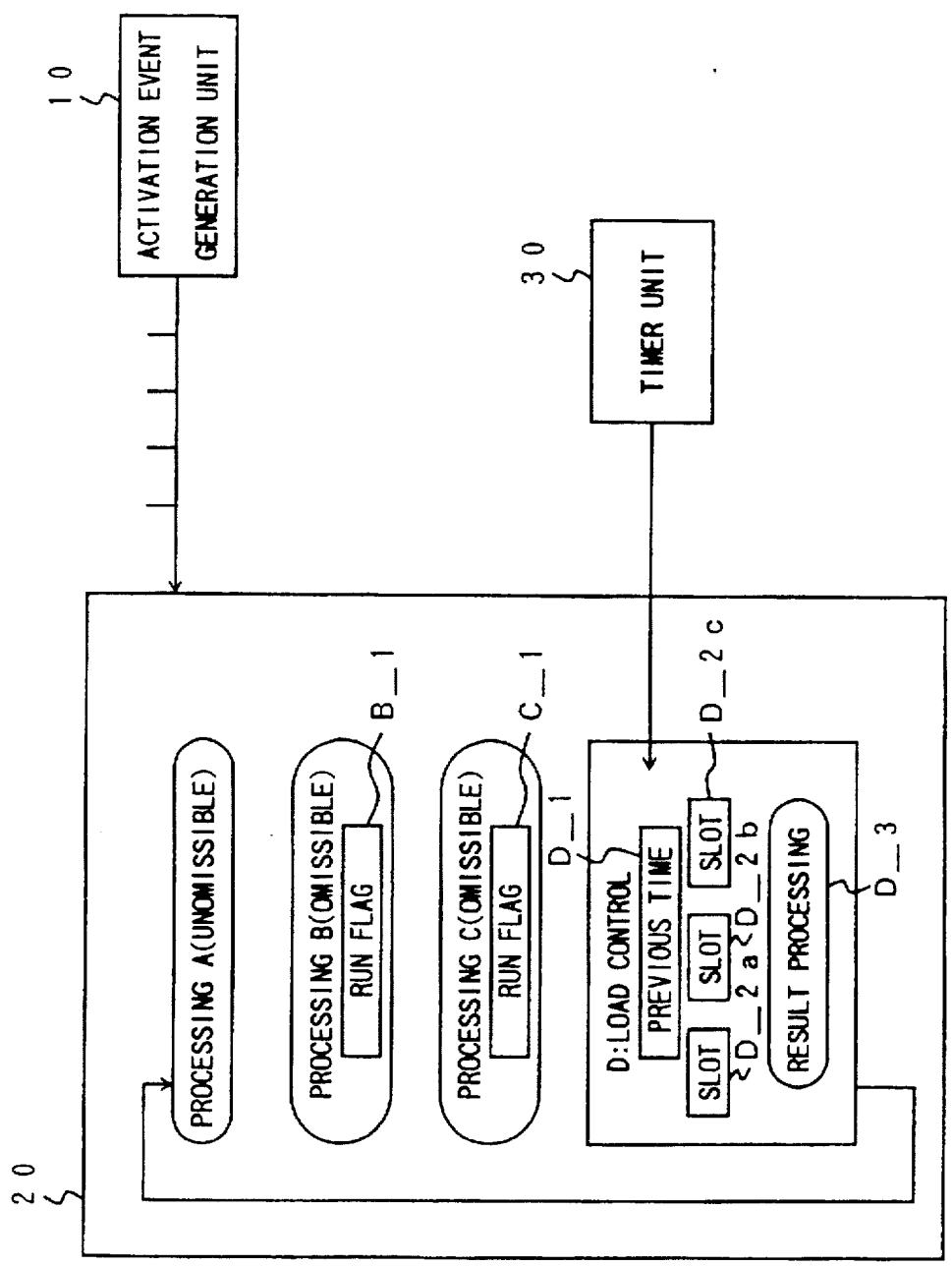

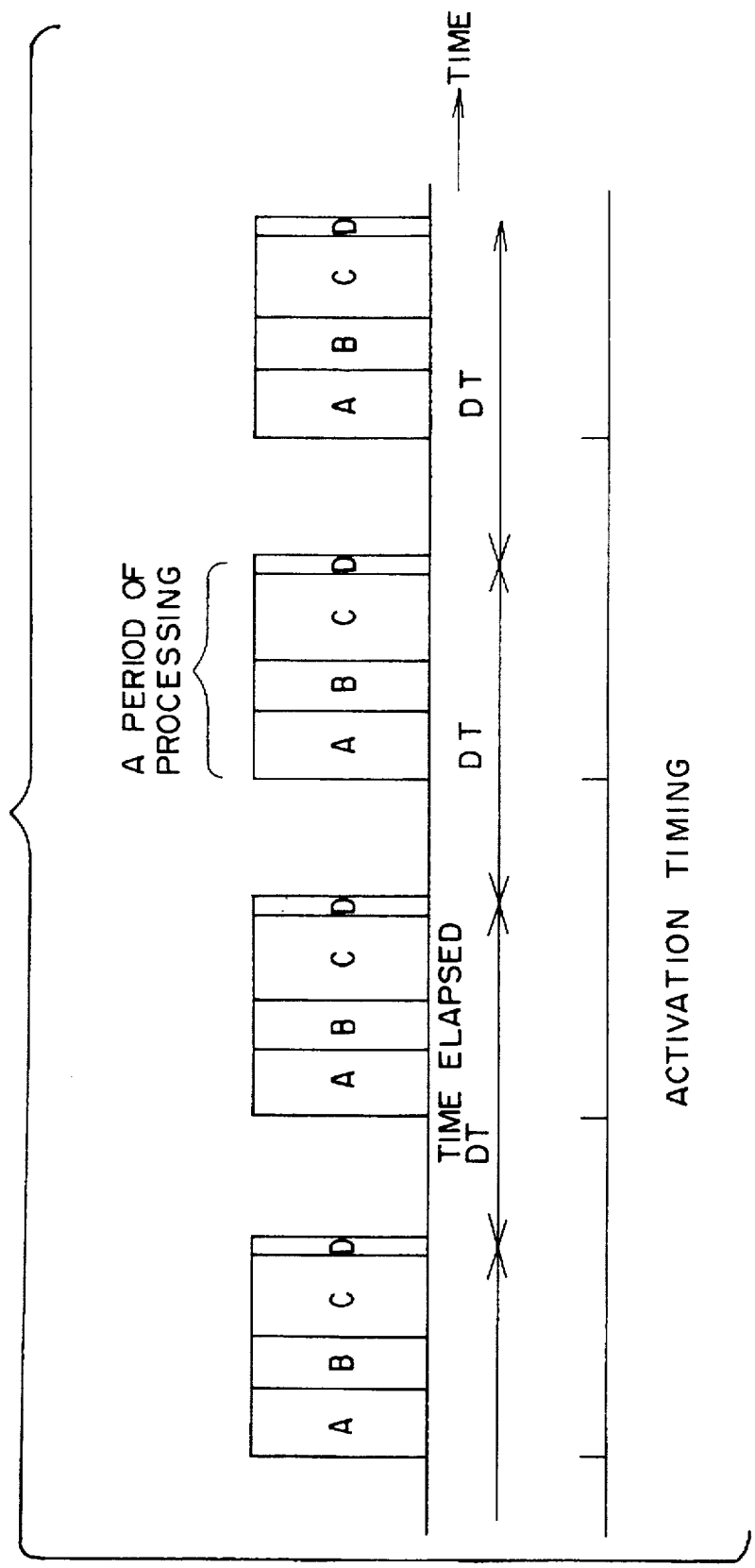

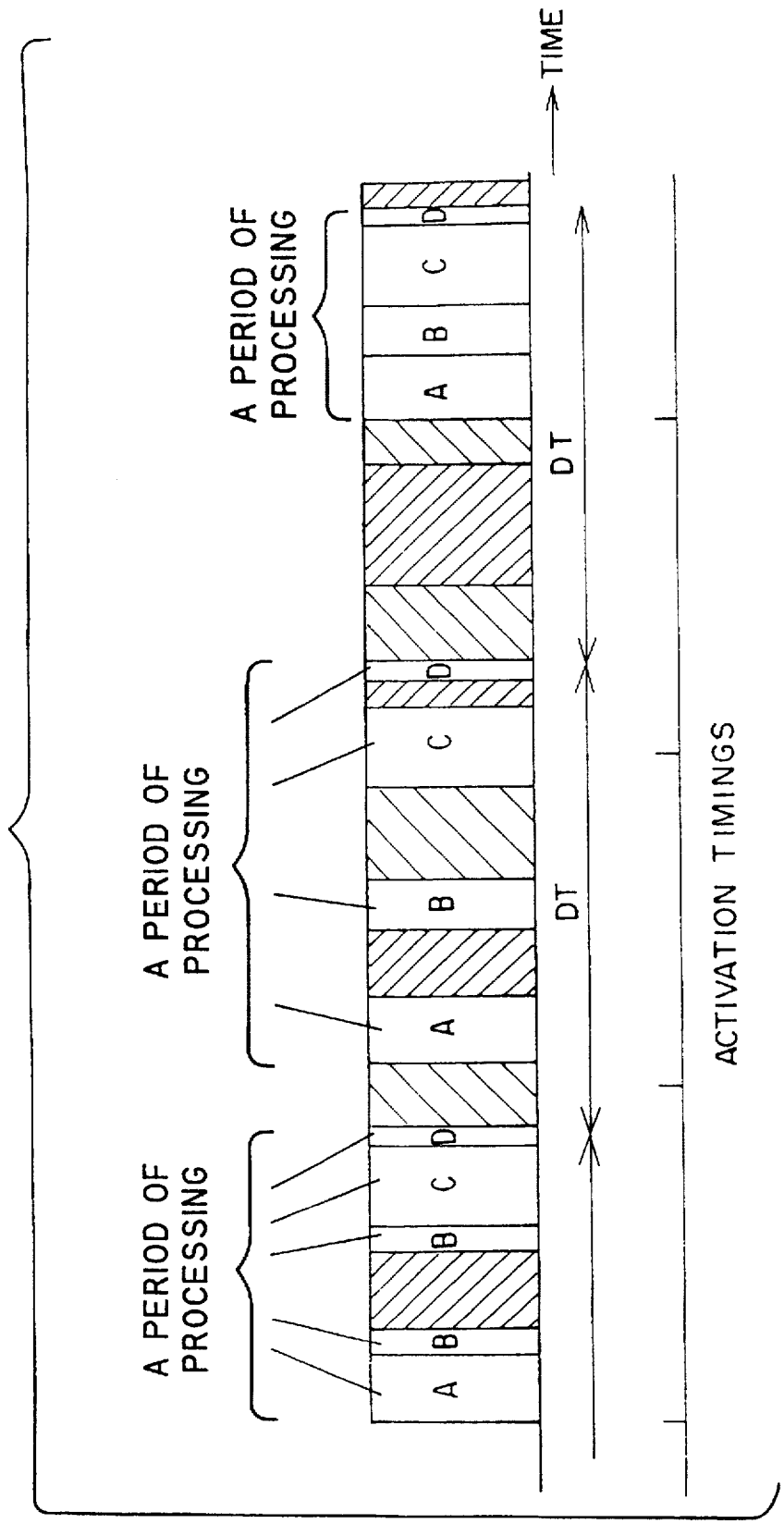

PERIODIC PROCESS LOAD CONTROL SYSTEM AND PERIODIC PROCESS RECORDING MEDIUM

BACKGROUND OF THE INVENTION

1. Field of the Invention

The present invention relates to a periodic process load control system for controlling a load of a CPU in conjunction with an execution of a periodic process in a multiple-process operating system having the CPU in which a plurality of processes including a periodic process activated periodically are executed on a time division basis, and a periodic process recording medium for storing a periodic process into which such a load control function is incorporated.

2. Description of the Related Art

Multiple-process operating systems according to a time sharing system in which a plurality of processes are executed on a time division basis have come into wide use recently, as computer systems advance in technology.

In case of the multiple-process operating systems according to the time sharing system, basically, the respective processes are operative independently of one another. Selection of execution of processes is dependent upon a structure of the time sharing system. if a certain process takes a lot of time for the processing, the subsequent processes will be delayed in their processing by the corresponding time. Further, in the event that there exists a process which is expected to operate at a specified time with the use of a timer event or the like, the process does not always operate at the specified time for certain reasons (e.g. priority sequence of the process, an interruption and the like) of the system.

FIG. 15 is a time chart, in the event that there exist only periodic processes periodically repeatedly executed using a timer event, showing execution time of the periodic processes. FIG. 16 is a time chart, in the event that there exist the periodic processes mentioned above and in addition other processes to be executed, showing execution time of the respective processes. In FIG. 16, the blank areas denote execution time of the periodic process of interest and shaded portions denote execution time of another process.

For example, as shown in FIG. 15, in the event that there exist only periodic processes periodically repeatedly executed using a timer event, the periodic processes are activated in accordance with expected start timings complied with the timer event.

On the other hand, in the event that a plurality of processes exist, as shown in FIG. 16, there arises such a problem that a period of processing is not terminated within a determined period of time and spreads over the subsequent period of time for the reasons such that an interruption occurs, a start timing delays due to a higher priority of process, or executions of other processes are concentrated, so that an execution of the periodic process associated with such a period of time is inadvertently skipped. For those reasons, there is a tendency that processings are delayed, in other word, a real-time operating ability is damaged. Hereinafter, the term "real-time operating ability" will be used in this meaning.

Thus, in case of time sharing systems, it happens that even a process for which a high degree of real-time operating ability is required, for example, video or audio, is affected by load of processes for which another type of real-time operating ability is required, and the processing cannot be done in time as required. This causes the real-time operating ability to be damaged.

SUMMARY OF THE INVENTION

In view of the foregoing, it is therefore an object of the present invention to provide a periodic process load control system capable of easing damages on a real-time operating ability of a periodic process activated periodically, even if a load of a CPU is increased by an execution of another process, and further to provide a periodic process recording medium for storing a periodic process having means for easing damages on a real-time operating ability of a periodic process activated periodically.

To attain the above-mentioned object, according to the present invention, there is provided a periodic process load control system for controlling a load of a CPU in conjunction with an execution of a periodic process in a multiple-process operating system having the CPU in which a plurality of processes including a periodic process activated periodically are executed on a time division basis, said periodic process load control system comprising:

an activation event generation unit for periodically generating events to activate said periodic process, wherein said periodic process comprises: a soft real time process portion capable of performing a selection of execution and omission of processings, a selective execution among a plurality of processings different in load, or a selection of frequency of an execution of processings; and a load control portion operative whenever the event occurs in which a time interval between a previous operating time and a current operating time is measured to evaluate a load evaluation value consisting of an accumulation value of a plurality of past time intervals, for instructing said soft real time process portion to perform the selection of execution and omission of processings, the selective execution of a specified processing among the plurality of processings, or the selection of frequency of an execution of processings, in accordance with the load evaluation value.

In the periodic process load control system mentioned above, it is preferable that said load control portion compares the load evaluation value with a threshold value, and instructs said soft real time process portion to perform the selection of execution and omission of processings, the selective execution of a specified processing among the plurality of processings, or the selection of frequency of an execution of processings, in accordance with a comparison result, and said periodic process load control system further comprises a threshold input unit for optionally inputting the threshold value.

In the periodic process load control system mentioned above, it is preferable that said load control portion has a plurality of slots each for storing the accumulation value of the plurality of past time intervals evaluated by said load control portion, and an addition value of the accumulation values stored in the plurality of slots is used as the load evaluation value.

In this case, it is preferable that the periodic process load control system further comprises a slot condition input unit for optionally inputting a number of the slots, and /or a number of pieces of time elapsed constituting the accumulation value stored in a single slot.

Further, to attain the above-mentioned object, according to the present invention, there is provided a periodic process recording medium for storing a periodic process periodically repeatedly executed, wherein said periodic process comprises: a soft real time process portion capable of performing

3 a selection of execution and omission of processings, a selective execution among a plurality of processings different in load, or a selection of frequency of an execution of processings; and a load control portion operative whenever the event occurs in which a time interval between a previous operating time and a current operating time is measured to evaluate a load evaluation value consisting of an accumulation value of a plurality of past time intervals, for instructing said soft real time process portion to perform the selection of execution and omission of processings, the selective execution of a specified processing among the plurality of processings, or the selection of frequency of an execution of processings, in accordance with the load evaluation value.

According to the present invention, the time interval is measured by the load control portion constituting the periodic process to evaluate a load evaluation value consisting of an accumulation value of the time intervals. And a load of the periodic process itself is controlled in accordance with the load evaluation value. Consequently, it is possible to ease damages of a real-time operating ability.

Further, a provision of the threshold input unit makes it possible through varying the threshold value to control a balance between an insurance of a real-time operating ability and a demerit caused by an omission of execution of the processing of the soft real time process unit, a selection of the processing smaller in load of a plurality of processings constituting the soft real time process portion, or degrading frequency of execution of processings of the soft real time process portion.

Furthermore, a provision of the slot condition input unit makes it possible to perform alterations, which are caused by varying the load in its entirety, such as an alteration of omission or execution of the processing of the soft real time process portion, an alteration of the processing selected among a plurality of processings constituting the soft real time process portion, or an alteration of frequency of execution of processings of the soft real time process portion, thereby obtaining a responsibility suitable for the system or the users of the system.

BRIEF DESCRIPTION OF THE DRAWINGS

FIG. 2 is a view of a periodic process load control system according to one embodiment of the present invention, which is implemented in the computer system shown in FIG. 1;

FIG. 6 is an illustration useful for understanding the states of execution of periodic processes in the event that there exists no process to be executed other than the periodic processes;

FIG. 7 is an illustration useful for understanding, in the event that there exist processes to be executed in addition to periodic processes, the states of execution of those processes including the periodic processes;

4

Figure 1:
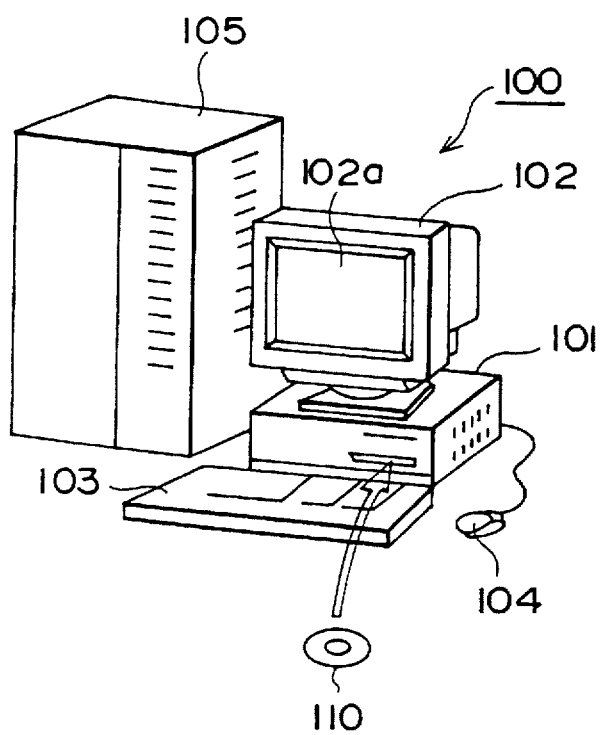
FIG. 1 is a perspective illustration of a computer system including a periodic process load control system according to an embodiment of the present invention.
Figure 9:
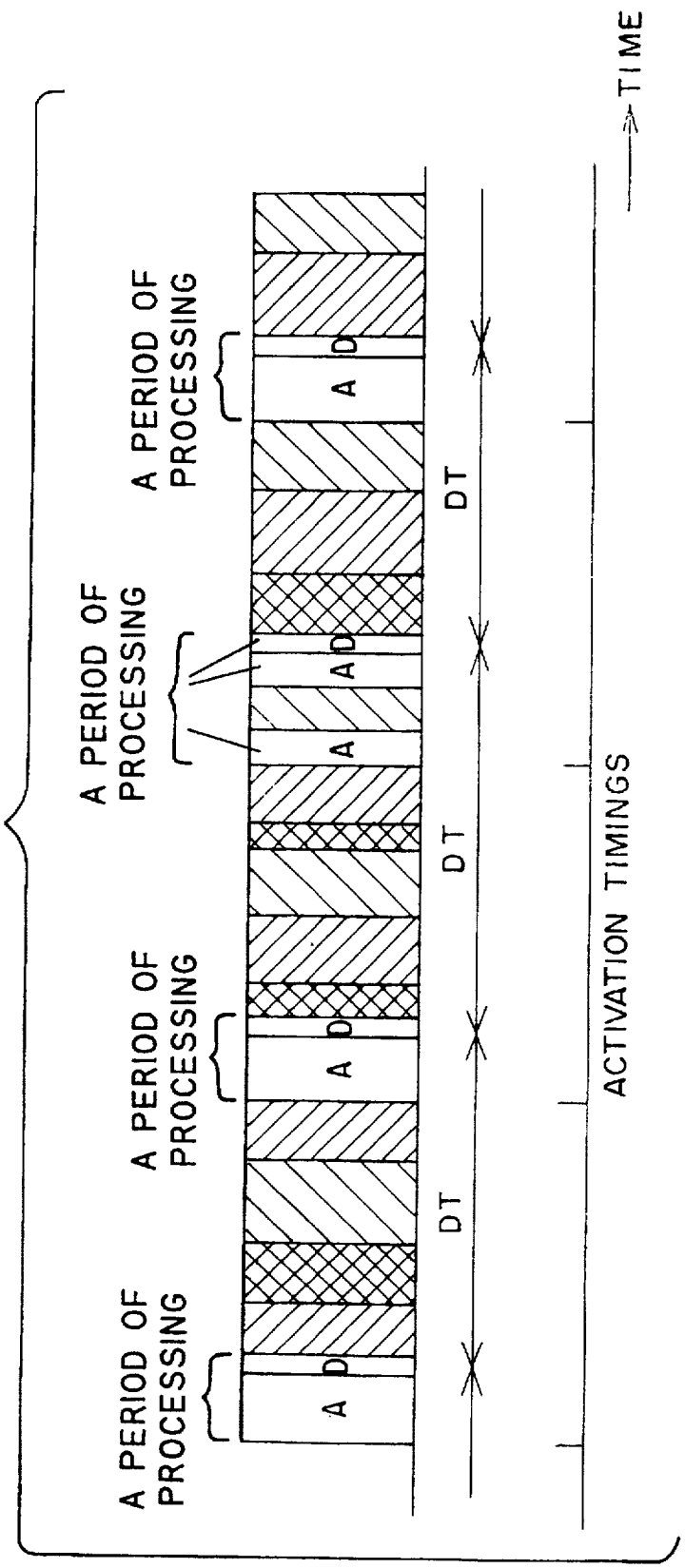
Figure 10:
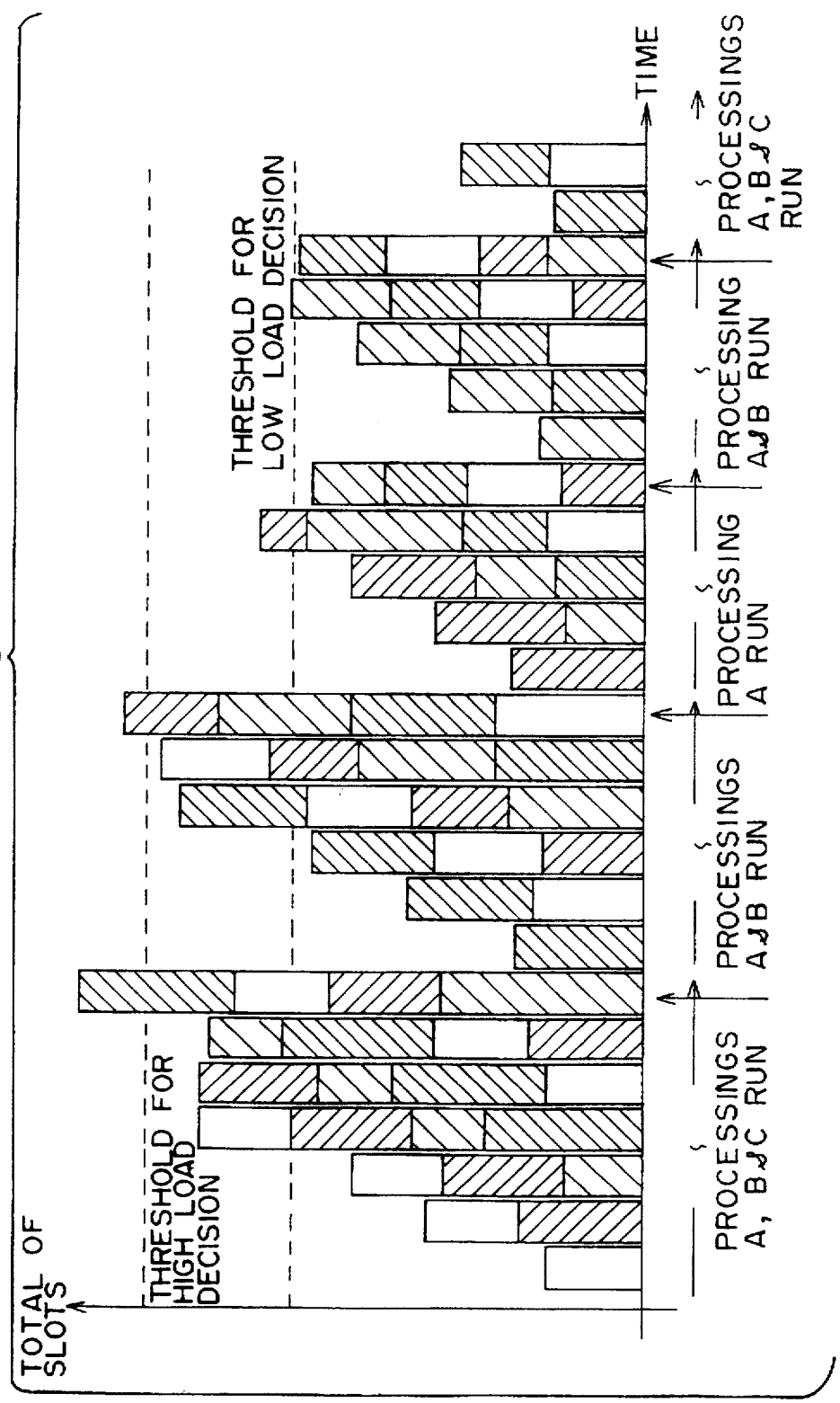
Figure 11:
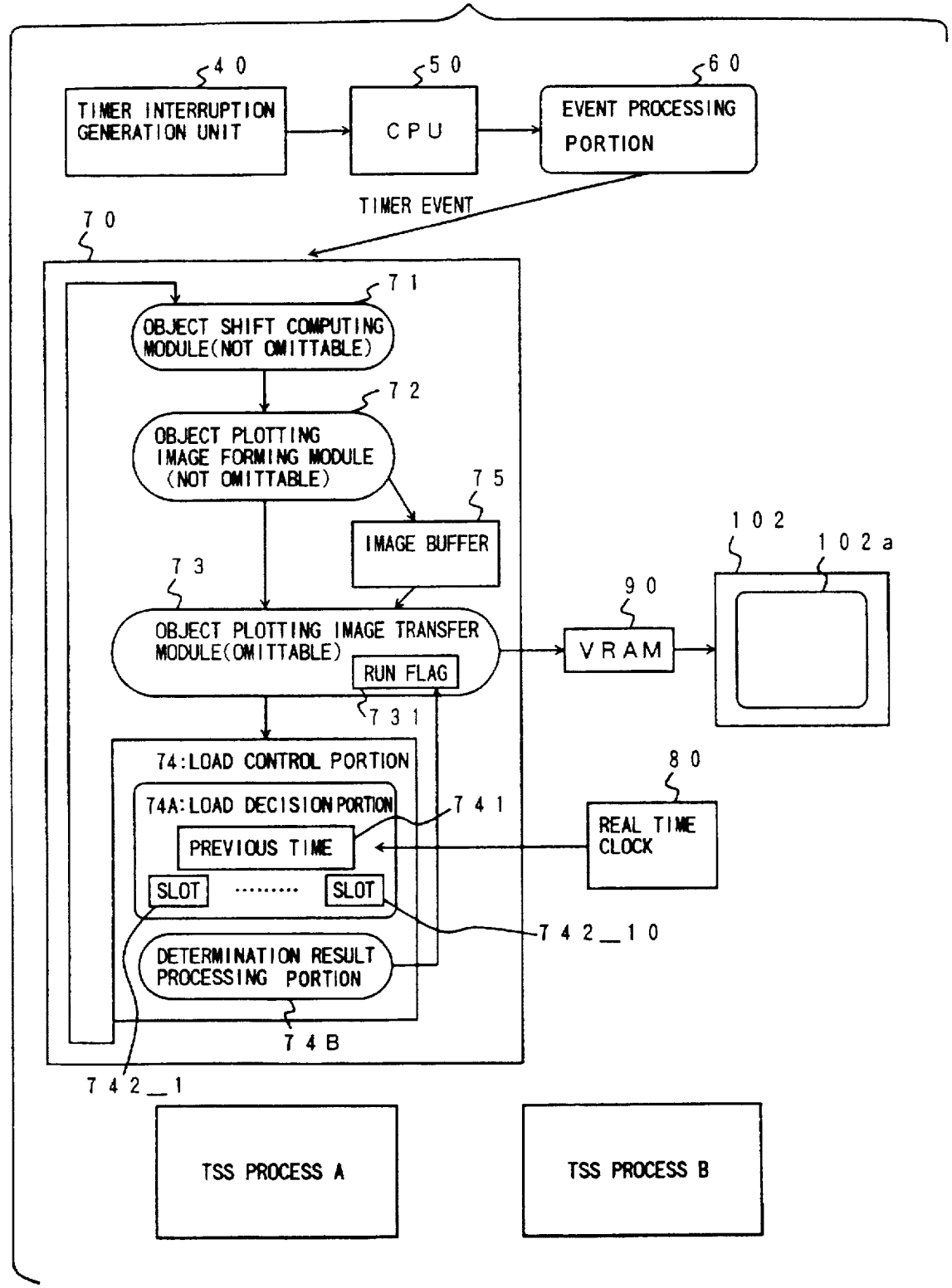
Figure 12:
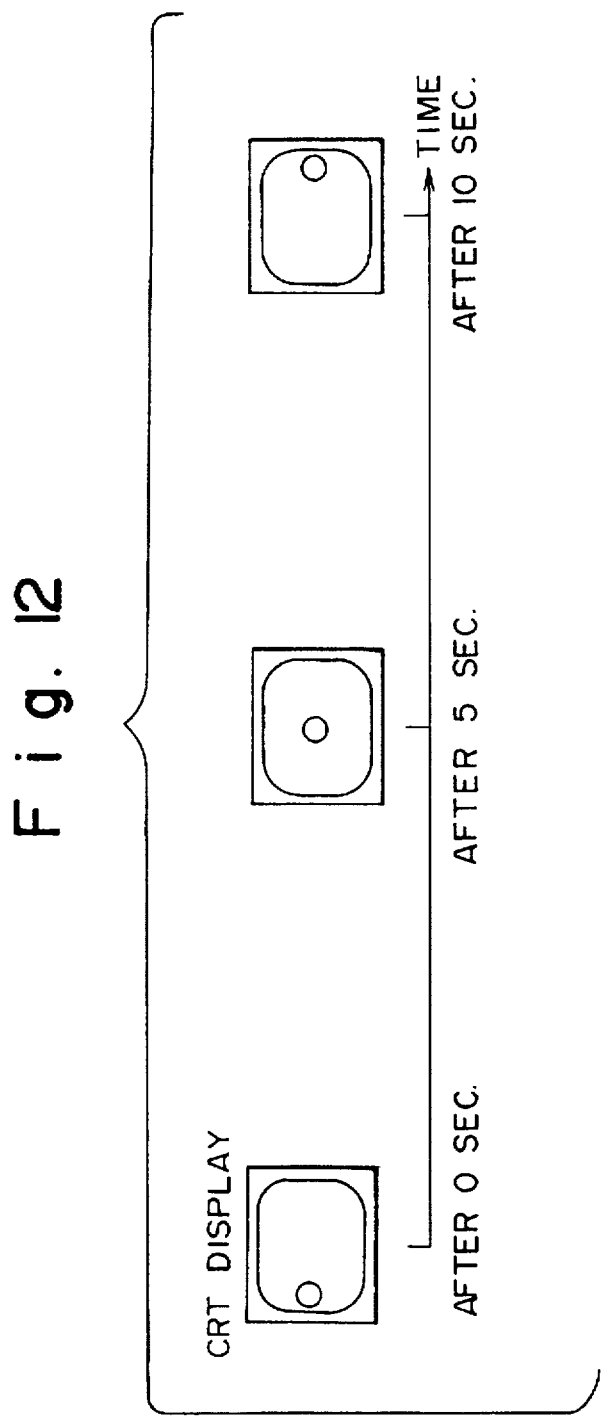
Figure 13:
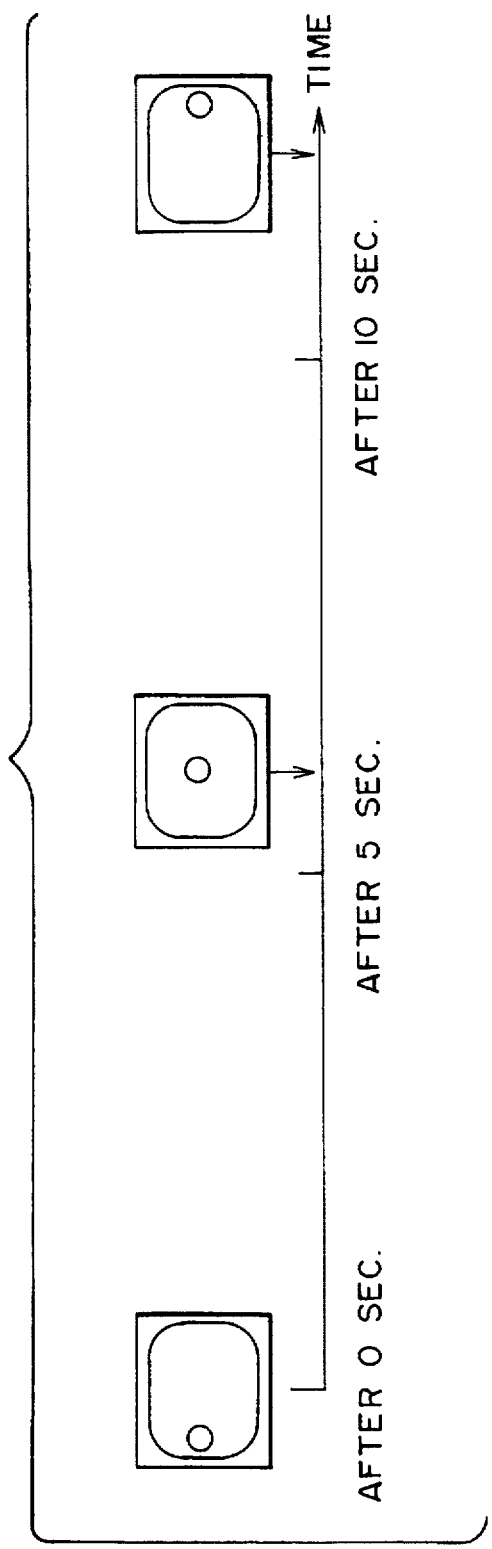
Figure 14:
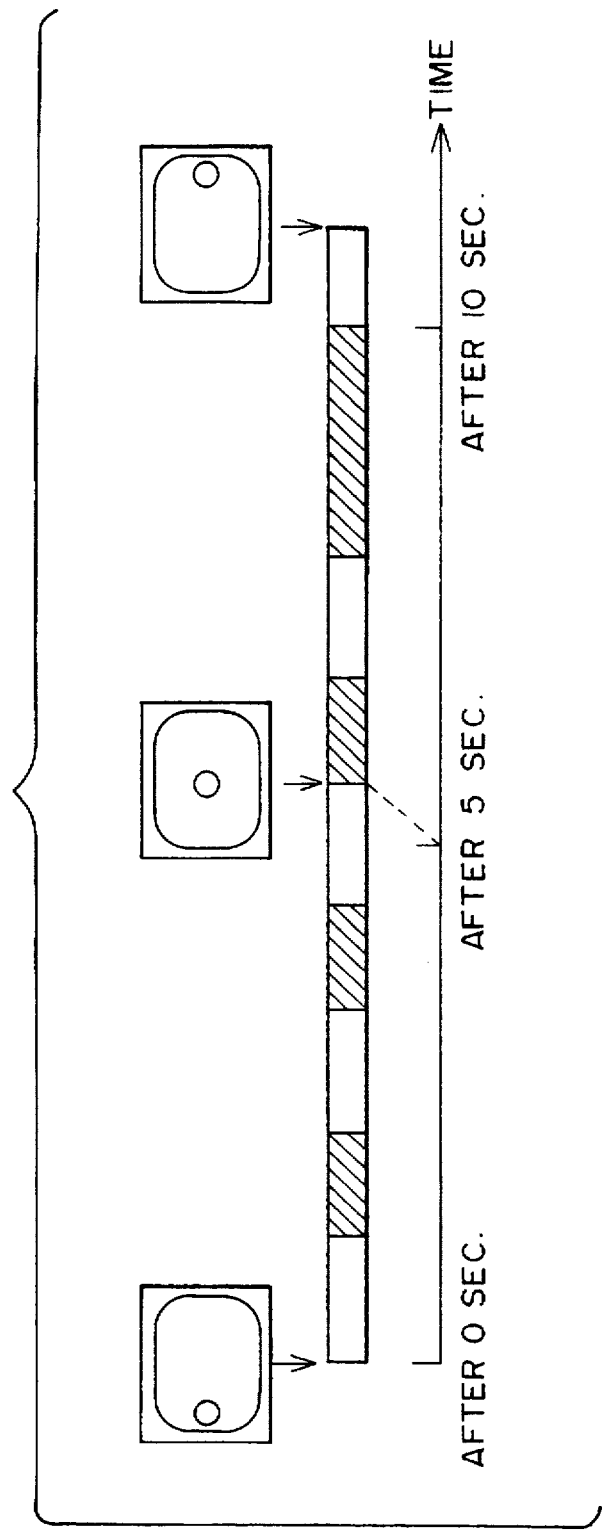
Figure 15:
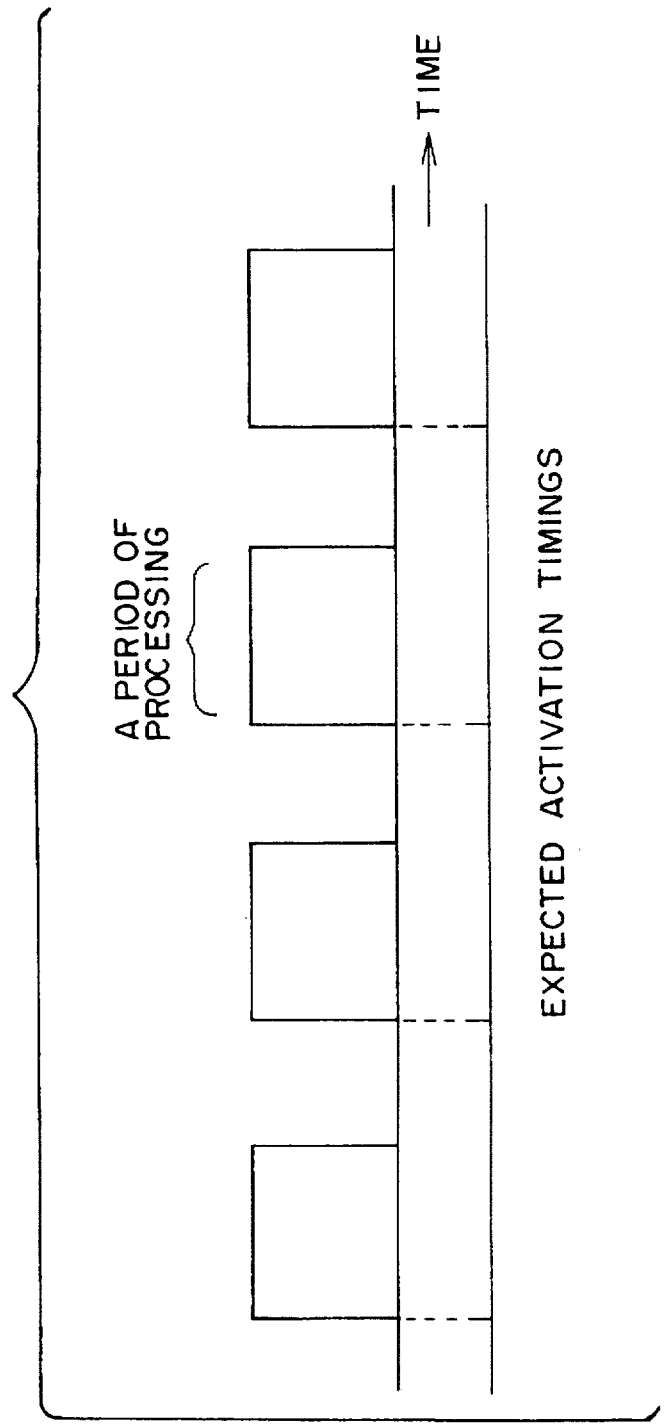
Figure 16:
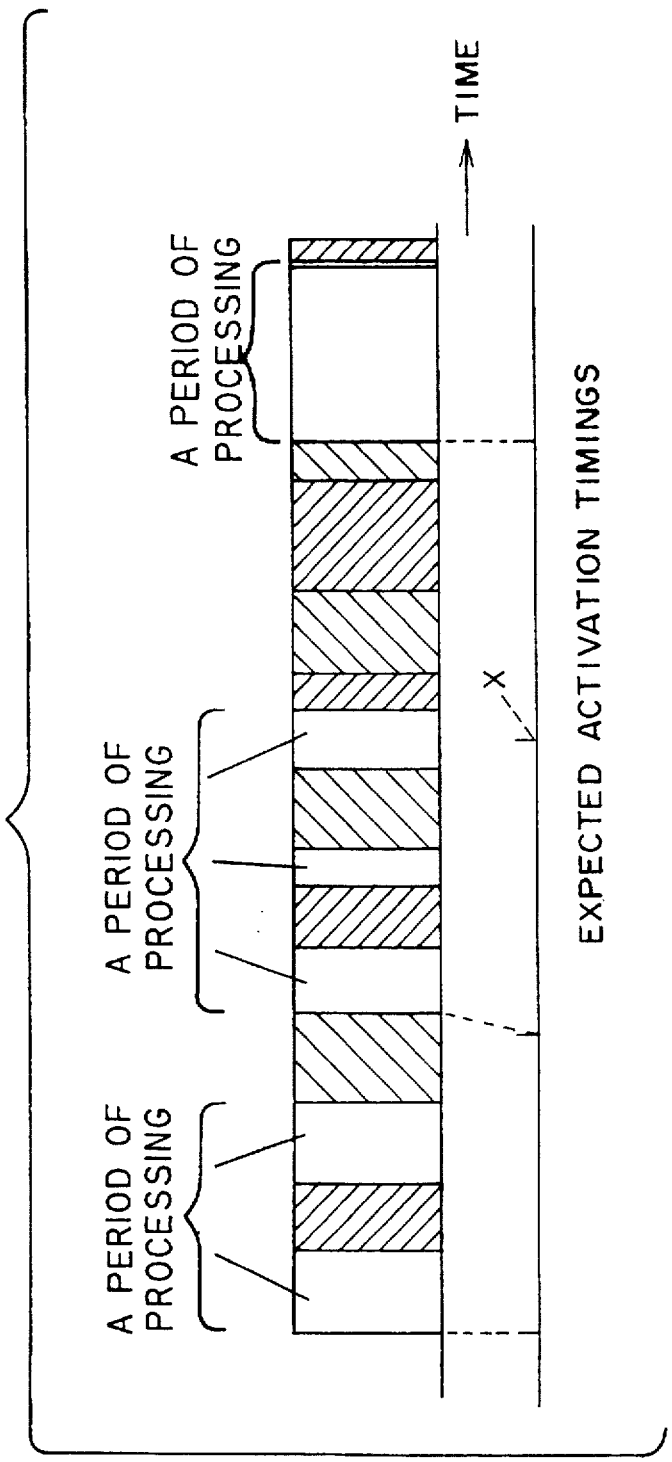

FIG. 9 is an illustration useful for understanding the states of execution of processes in the event that execution of both types of processings B and C are omitted;

FIG. 10 is a typical illustration showing changes of load evaluation values;

FIG. 11 is a view of a periodic process load control system according to a more detailed embodiment of the present invention, which is implemented in the computer system shown in FIG. 1;

FIG. 12 is a typical illustration showing changes of an image in time displayed on a display screen of a CRT display in the event that no disturbance occurs in an execution period;

FIG. 13 is a typical illustration showing changes of an image displayed corresponding to the conventional example;

FIG. 14 is a typical illustration showing changes of an image displayed in case of the present embodiment;

FIG. 15 is a time chart, in the event that there exist only periodic processes periodically repeatedly executed using a timer event, showing execution time of the periodic processes; and FIG. 16 is a time chart, in the event that there exist processes to be executed in addition to periodic processes, showing execution time of those processes.

DESCRIPTION OF THE PREFERRED EMBODIMENTS

Hereinafter, there will be described embodiments of the present invention.

FIG. 1 is a perspective illustration of a computer system including a periodic process load control system according to an embodiment of the present invention.

In FIG. 1, a computer system 100 comprises: a main body unit 101 incorporating thereinto a CPU, an MO (magneto-optical disc) drive and the like; a CRT display 102 for displaying on its display screen 102a images in accordance with an instruction from the main body unit 101; a keyboard 103 for inputting various types of information to the computer system 100; a mouse 104 for designating a desired position on the display screen 102a of the CRT display 102; and a recording unit 105 for storing periodic processes or the like which will be described hereinafter.

A development of processes (programs) including the periodic processes can be implemented by the computer system 100 shown in FIG. 1. It is acceptable that processes, which are developed by another same type of computer system, are stored in a portable type of recording medium such as an MO (magneto-optical disc) 110, and the MO 110 is loaded into the computer system 100 shown in FIG. 1 so that the developed processes can be inputted into the computer system 100. Likewise, it is possible to transfer the processes developed with the use of the computer system 100 shown in FIG. 1 through the MO 110 to another computer system.

FIG. 2 is a view of a periodic process load control system according to one embodiment of the present invention, which is implemented in the computer system shown in FIG. 1.

An activation event generation unit 10 periodically generates events to activate a periodic process 20. The periodic process 20 is executed whenever the event occurs. A timer unit 30 manages the current time and serves to transfer the current time to the periodic process 20 in accordance with the request of the periodic process 20.

The periodic process 20 comprises three types of processings A, B and C and a load control portion D.

The processing A is, for example, a processing in which it is needed that the internal state synchronized with the current time is maintained. Specifically, the processing A implies such a processing that the internal time is not kept good time if the processing is not surely executed whenever the activation event generation unit 10 generates the event. In other words, the processing A is a processing which is needed to be executed, whenever the event is generated, in order to maintain the internal state of the periodic process 20 at a predetermined state.

On the other hand, the processings B and C are such a type of processing that while it is desired that the processing is executed whenever the event is generated, the subsequent execution of the processing concerned makes it possible to restore the same state as the case in which the processing is executed whenever the event is generated. Here, in comparison of the processings B with C as to which one is more preferable to be executed whenever the event is generated, it is assumed that the processing B is more preferable.

The processings B and C have run flags B__1 and C__1, respectively. The run flags B__1 and C__1 are set or reset in accordance with the load control portion D which will be described later. In the event that the processing B is executed, first, the run flag B__1 is referred to. If the run flag B__1 is set, the processing B is executed. On the other hand, if the run flag B__1 is reset, the processing B is omitted. This is the similar as to the matter of the processing C.

The load control portion D comprises: a time saving portion D__1 for saving the previous time; a plurality of slots D__2a, D__2b and D__2c for saving time elapsed from the previous time to the current time, or an accumulated value of a plurality of past times elapsed; and a determining result processing portion D__3 for processing a result of determination of a load condition. The load control portion D determines a load condition of the periodic process 20 in accordance with a manner which will be described later. The determining result processing portion D__3 sets or resets the run flags B__1 and C__1 of the processings B and C in accordance with a determination result of a load condition of periodic process 20.

The recording unit 105 (cf. FIG. 1), which stores the periodic process 20 shown in FIG. 2, corresponds to an embodiment of the periodic process recording medium according to the present invention. When the periodic process 20 shown in FIG. 2 is down-loaded into the MO 110, the MO 110, which stores the periodic process 20, also corresponds to an example of the periodic process recording medium according to the present invention.

Figure 3A:
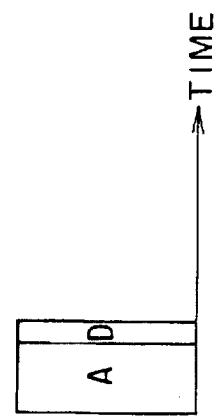
FIGS. 3a, 3b and 3c are typical illustrations showing loading per once as to a periodic process in each of load states.
Figure 3B:
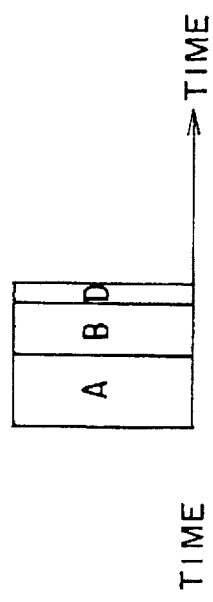
Figure 3C:
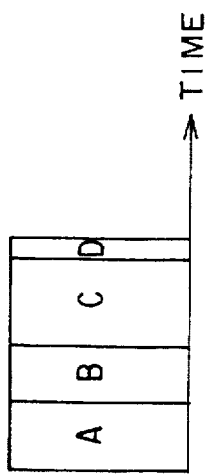

FIGS. 3a, 3b and 3c are typical illustrations showing loading per once as to a periodic process in each of load states.

When the event is generated by the activation event generation unit 10, in case of low load, as shown in FIG. 3a, processing A, processing B, processing C, and processing of the load control portion D are executed in the named order. In case of high load, as shown in FIG. 3b, processing A and processing B are executed, and then processing of the load control portion D is executed omitting processing C. In case of higher load, as shown in FIG. 3c, processing A is executed, and then processing of the load control portion D is executed omitting processings B and C. In this manner, a degradation of a real-time operating ability of the periodic process 20 in case of the high load is eased.

Figure 4:
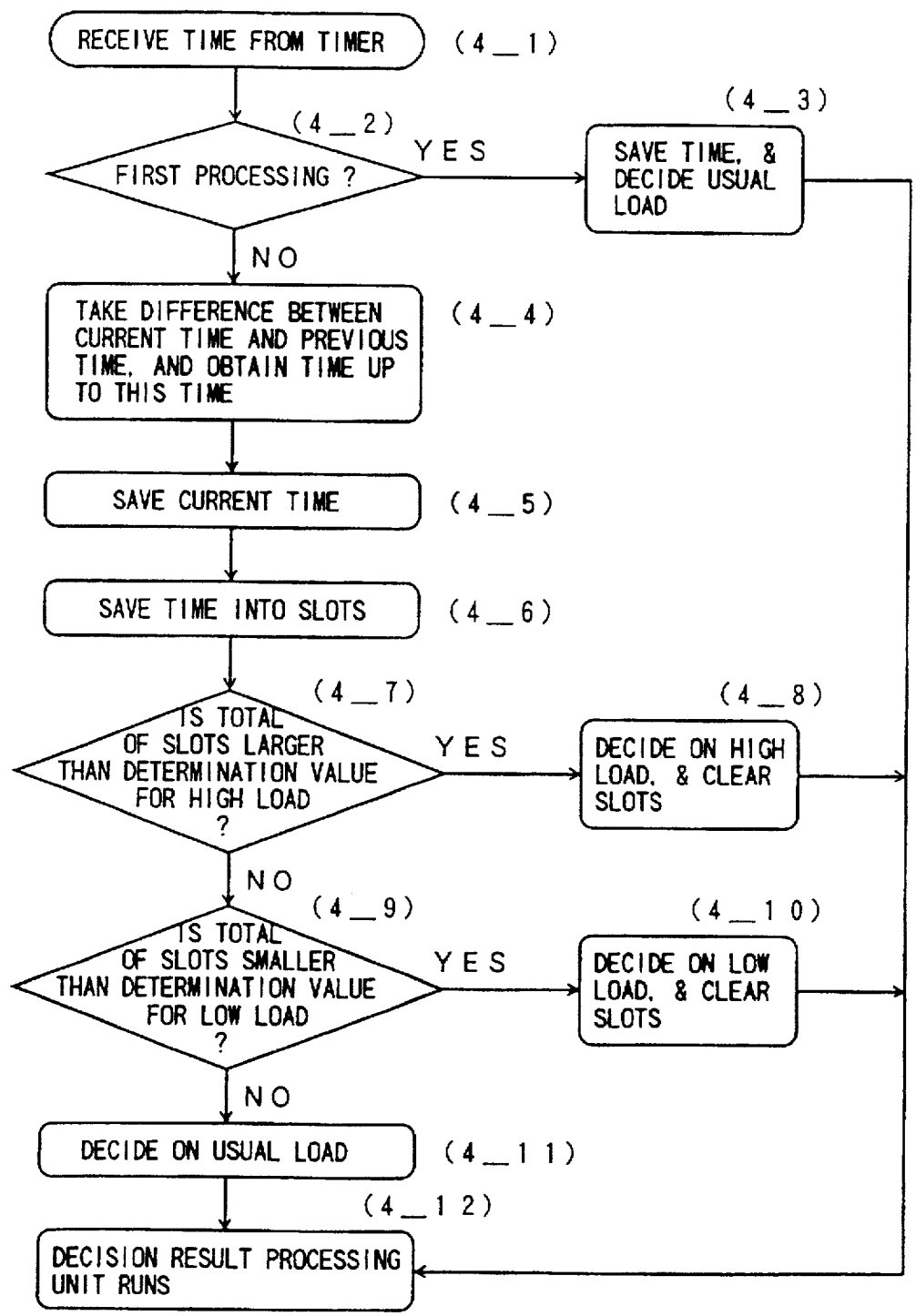
FIG. 4 is a flowchart useful for understanding processings of a load control portion.

FIG. 4 is a flowchart useful for understanding processings of the load control portion D.

When an execution of processing of the load control portion is initiated, first, taking in of time from the timer unit 30 is performed (step 4__1). Time to be taken in from the timer unit 30 is not needed to be the current time, and is permissible also to be time elapsed from the time at which execution of a process is first activated. In effect, any one is acceptable, as time to be taken in from the timer unit 30, which can determine time elapsed corresponding to a difference between the current time and the previous time.

Next, in step 4__2, it is decided as to whether the processing of the periodic process 20 is first executed at this time. When it is decided that the processing of the periodic process 20 is first executed, time taken in from the timer unit 30 is saved into the time saving portion D__1, and it is decided as the usual load (step 4__3). Then the process goes to step 4__12 in which the processing of the determining result processing portion D__3 is executed. The processing of the determining result processing portion D__3 will be described later. Before the periodic process 20 first operates, the run flags B__1 and C__1 of the processings B and C have been set as an initial state. Consequently, at the time of the first operation of the periodic process 20, the processings B and C are carried out, and thereafter the processing of the load control portion D shown in FIG. 4 is carried out.

In step 4__2, when it is decided that the processing of the periodic process 20 is not of the first execution, the process goes to step 4__4 in which a difference between time now obtained from the timer unit 30 and the previous time stored in the time saving portion D__1 is evaluated to generate time elapsed DT from the previous execution to the current execution. In step 4__5, the time now obtained from the timer unit 30 is stored in the time saving portion D__1.

In step 4__6, the time elapsed DT evaluated in step 4__4 is saved in one of the slots D__2a, D__2b and D__2c. In the saving, when time elapsed has been already stored in the slot concerned, the time elapsed DT is added to the time elapsed already stored in the slot concerned and then stored in the slot concern, that is, the accumulative value is stored in the slot.

FIGS. 5a, 5b, 5c, 5d and 5e are typical illustrations useful for understanding schemes of saving time elapsed of slots.

Figure 5A:
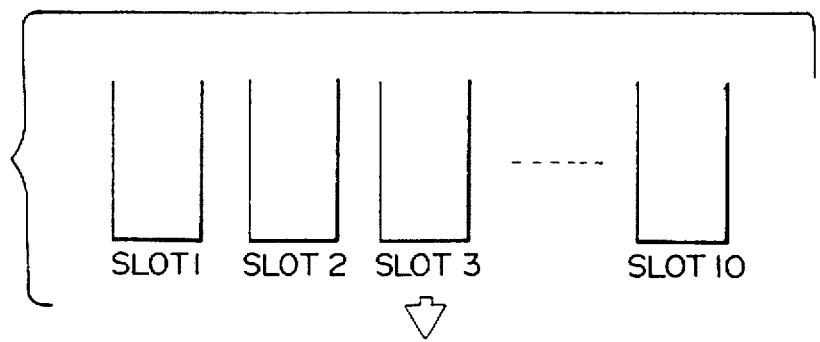
FIGS. 5a, 5b, 5c, 5d and 5e are typical illustrations useful for understanding schemes of saving time elapsed of slots.

There are prepared ten pieces of slots SLOT 1 to SLOT 10 each for storing an accumulation value of five times of time elapse. Specifically, starting from the state in which all of the slots SLOT 1 to SLOT 10 are empty as shown in FIG. 5a, first, five times of time elapse are sequentially accumulated and stored in the slot SLOT 1. When the slot SLOT 1 fills up, the slot SLOT 2 is used to sequentially accumulate and store therein the subsequent five times of time elapse. Likewise, the slots SLOT 3 to SLOT 10 are used in turn to sequentially accumulate and store therein the subsequent five times of time elapse.

Figure 5B:
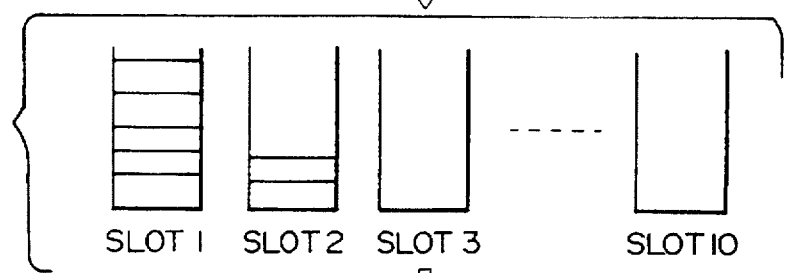
Figure 5C:
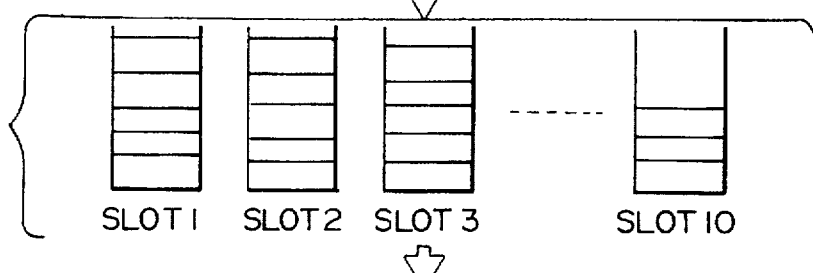
Figure 5D:
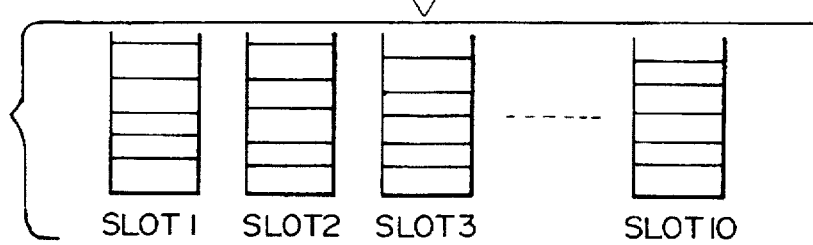
Figure 5E:
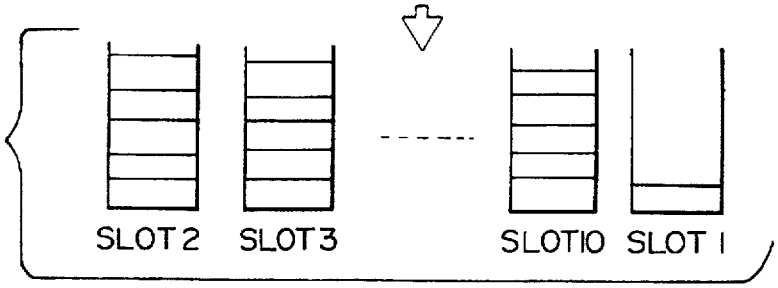

FIGS. 5b, 5c and 5d show the state in which 5+2=7 times of time elapse have been stored in the slots SLOT 1 and SLOT 2, the state in which 5×9+3=48 times of time elapse have been stored in the slots SLOT 1 and SLOT 10, and the state in which 5×10=50 times of time elapse have been stored in the slots SLOT 1 and SLOT 10 to just fill up, respectively. As shown in FIG. 5d, when the slots SLOT 1 and SLOT 10 fill up, the slot (here SLOT 1) in which time elapsed is first stored is cleared, and up-to-date time elapsed is stored in the slot cleared (here SLOT 1). Hereinafter, such a processing is repeatedly performed. However, as will be described hereinafter, in the event that it is decided as the "high load" and the "low load" other than "usual load", at the time of such a decision, all of the slots SLOT 1 and SLOT 10 are cleared so as to be returned to the state of FIG. 5a. Thereafter, again, a plurality of pieces of time elapsed are stored in the slots in turn from the first time elapsed.

According to the present embodiment, while each of the slots stores an accumulation value of a plurality of pieces (five) of time elapsed, it is acceptable that the number of slots is increased to store a piece of time elapsed in each of the slots. However, in this case, there is a need to prepare a large storage capacity of memory, since the number of slots is increased.

It is preferable that there is provided such an arrangement that the number of slots (ten pieces in the example shown in FIGS. 5a–5e) and the number of pieces of time elapsed (five pieces in the example shown in FIGS. 5a–5e) can be optionally set up through an operation of the keyboard 103 shown in FIG. 1, instead of being fixed. Updating those settings make it possible to control the time interval to be decided as the high load or the low load even if the same load condition offers.

Again referring to FIG. 4, an explanation of the flowchart of processings of the load control portion will be continued.

In step 4_7, accumulation value-to-accumulation value of the time elapsed stored in a plurality of slots are added to one another to evaluate a load evaluation value, and it is determined as to whether the load evaluation value is larger than a threshold which is a determination value for the high load. When it is determined that the load evaluation value is larger than the threshold or the determination value, the process goes to step 4_8 in which it is decided that the load is the high load, and all the slots are cleared. Thereafter, the process goes to step 4_12 in which the processing of the determining result processing portion D_3 is executed.

A decision as to whether the load is the high load in step 4_7 is performed whenever the time elapsed is detected once, in other words, whenever the periodic process is activated once.

In step 4_7, when it is decided that the load is not the high load, the process goes to step 4_9 in which the load evaluation value is smaller than a threshold which is a determination value for the low load.

The decision as to whether the load is the low load is performed in the state that all the slots fill up, that is, according to the example shown in FIGS. 5a–5e, the state of FIG. 5d, and is performed every when time elapsed is evaluated by five times while all the slots are not cleared simultaneously.

In step 4_9, when it is decided that the load evaluation value is smaller than the determination value for the low load, the process goes to step 4_10 in which it is decided that the load is the low load, and all the slots are cleared. Thereafter, the process goes to step 4_12 in which the processing of the determining result processing unit D_3 is executed.

As the threshold used in the decision as to whether the load is the high load in step 4_7, the following expression is deemed to be a standard when a delay of, for example, 20% of the set up period is regarded as a limit of damage of a real-time operating ability.

$$T \times DT_{MAX} \times 1.2 \qquad (1)$$

Where T: The set up period (generation intervals of events of the activation event generation unit 10)
$DT_{MAX}$: The maximum saving number (5×10=50 slots in case of the example shown in FIGS. 5a–5e) of the time elapsed DT by a plurality of slots As the threshold used in the decision as to whether the load is the low load in step 4_9, the following expression is deemed to be a standard when a delay of, for example, 20% of the set up period is regarded as a limit of damage of a real-time operating ability.

$$T \times DT_{MAX} \qquad (2)$$

Where T: The set up period (generation intervals of events of the activation event generation unit 10)
$DT_{MAX}$: The maximum saving number (5×10=50 slots in case of the example shown in FIGS. 5a–5e) of the time elapsed DT by a plurality of slots While it is acceptable that the thresholds of the high load and the low load taking into account, for example, the expressions (1) and (2) as the standard is fixed, it is preferable that there is provided such an arrangement that those thresholds can be varied through an operation of the keyboard 103 or the like by the operator. A provision of the variable threshold makes it possible for users to select a balance of a merit brought about through an execution of the processings B and C and a demerit due to the damage of a real-time operating ability brought about through an execution of the processings B and C.

In step 4_8, when it is decided that the load is the high load, the process goes to step 4_12 in which the processing of the determining result processing unit D_3 is executed. In the determining result processing unit D_3, when both the run flags B_1 and C_1 of the processings B and C have been set (the state in which both the processings B and C are to be executed), the run flag C_1 is reset. As a result, the execution of the processing C is omitted until the run flag C_1 is set again. On the other hand, when the run flag B_1 of the processing B has been set and the run flag C_1 of the processing C has been reset, the run flag B_1 is reset. The reason why this is to do so is that in the event that although the run flags C_1 of the processing C is reset before so that the execution of the processing C is omitted, it is decided that the load is the high load, the execution of the processing C is also omitted, thereby reducing the load to ensure a real-time operating ability. Further, when both the run flags B_1 and C_1 of the processings B and C have been already reset, there is nothing to be done, since the execution of the processing A cannot be omitted. Alternatively, it is acceptable that an alarm indicating the high load is displayed, for example, on the display screen 102a of the CRT display 102 shown in FIG. 1.

On the other hand, in step 4_10, when it is decided that the load is the low load, the process goes to step 4_12 in which the processing of the determining result processing unit D_3 is executed. In this case, in the determining result processing unit D_3, a flag operation reverse to the case of the high load is performed. Specifically, in the event that it is decided that the load is the low load, when both the run flags B_1 and C_1 of the processings B and C have been reset, the run flag B_1 is set. When the run flag B_1 of the processing B has been set and the run flags C_1 of the processing C has been reset, the run flag C_1 is set. The reason why this is to do so is that in the event that although the processings A and B are executed and the execution of the processing C is omitted, it is decided that the load is still the low load, the processing C is executed. Further, when both the run flags B_1 and C_1 of the processings B and C have been already set, there is nothing to be done.

In step 4_3 or step 4_11, when it is decided that the load is the usual load, the process goes to step 4_12 in which the processing of the determining result processing unit D_3 is executed. However, in this case, in determining result processing unit D_3, none of processings is carried out. That is, the state of execution of the processings B and C, or the state of omission of the execution are maintained.

In the determining result processing unit D_3, set ("1") and reset ("0") of the run flag B_1 of the processing B are implemented by the following function calls, respectively:

B_active_set (1)
B_active_set (0)

In a similar fashion, set ("1") and reset ("0") of the run flag C_1 of the processing C are implemented by the following function calls, respectively:

C_active_set (1)
C_active_set (0)

FIG. 6 is an illustration useful for understanding the states of execution of periodic processes in the event that there exists no process to be executed other than the periodic processes 20 shown in FIG. 20.

In this case, an overall periodic process including processings B and C is executed in synchronism with the activation timing (timing of an event generation by the activation event generation unit 10). In this case, the time elapsed DT is constant, and is the same as a period of the activation timing.

FIG. 7 is an illustration useful for understanding, in the event that there exist processes to be executed in addition to the periodic processes 20, the states of execution of those processes including the periodic process 20.

As seen from FIG. 7, the execution of other processings implies an interruption of the other processings into the periodic processes. This interruption causes the time elapsed DT to be increased.

Figure 8:
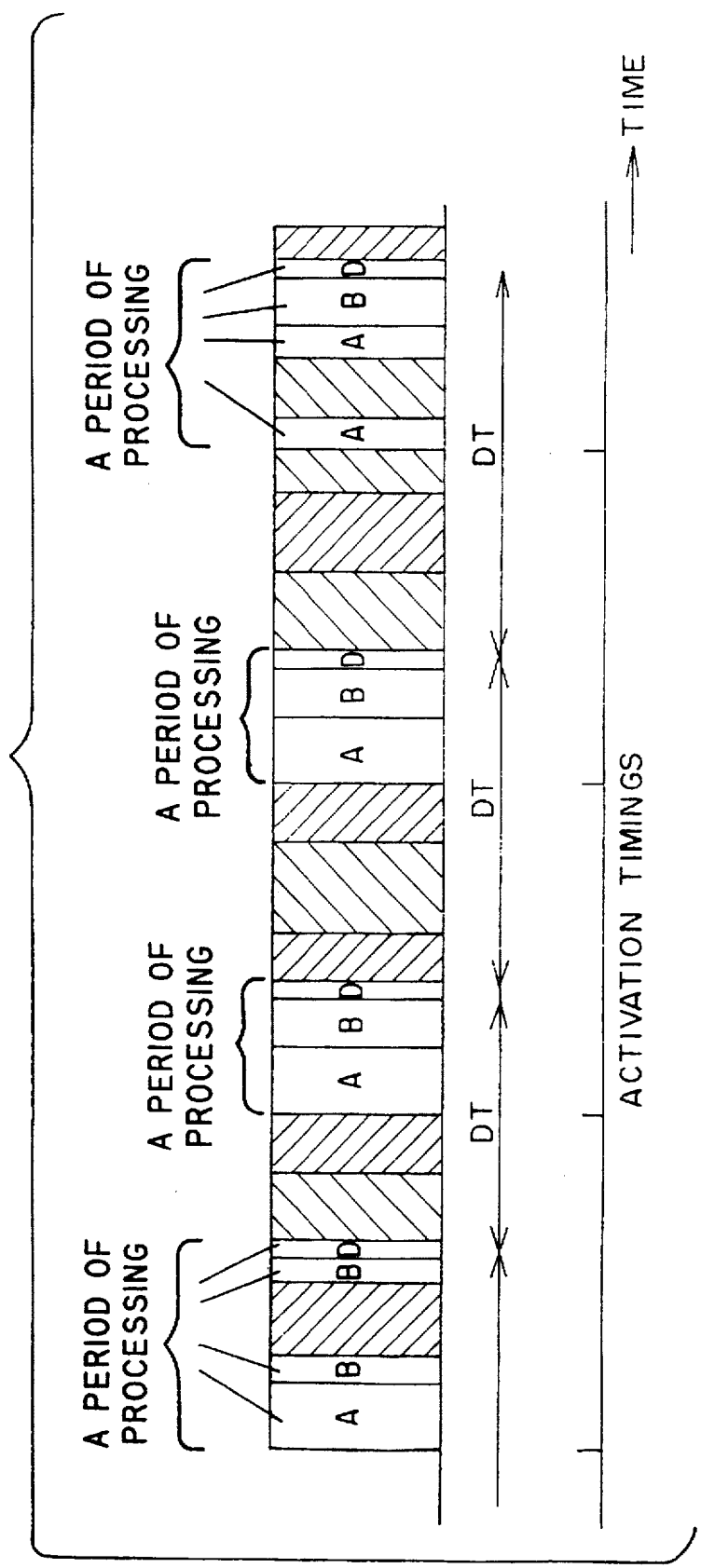
FIG. 8 is an illustration useful for understanding the states of execution of processes in the event that execution of processings C are omitted.

FIG. 8 is an illustration useful for understanding the states of execution of processes in the event that the execution of processings C are omitted. FIG. 9 is an illustration useful for understanding the states of execution of processes in the event that execution of both types of processings B and C are omitted.

As shown in FIG. 7, when the time elapsed DT is increased and as a result it is decided that the load is the high load, as shown in FIG. 8, the execution of the processings C is omitted, and the processings A and B and the processing of the load control portion D are executed in every activation timing, and other processes are executed.

Also in the state shown in FIG. 8, when the time elapsed DT is further increased and as a result it is again decided that the load is the high load, as shown in FIG. 9, the execution of the processings C and the processings B as well is omitted, and the processings A and the processing of the load control portion D are executed in every activation timing, and other processes are executed.

In the state shown in FIG. 9, when the time elapsed DT is reduced and as a result it is decided that the load is the low load, the state is returned to a state in which the processing B is executed as shown in FIG. 8. In the state shown in FIG. 8, when the time elapsed DT is reduced and as a result it is decided that the load is the low load, the state is returned to a state in which the processing C is executed as shown in FIG. 7.

FIG. 10 is a typical illustration showing changes of load evaluation values.

To simplify the situation, it is assumed that there are provided four slots each for storing a piece of time elapsed DT.

In the state that all the processings are executed, pieces of time elapsed are sequentially stored in the associated slots, respectively. A load evaluation value is evaluated on the basis of an addition value of four pieces of the time elapsed stored in the respective slots. At the time Ti, when the load evaluation value exceeds the threshold for the high load decision, the processing C is omitted in its execution at the time T1. The load evaluation value is continuously monitored. At the time T2, when the load evaluation value again exceeds the threshold for the high load decision, then the processing B is omitted in its execution at the time T2. At the time T3, since the load evaluation value does not exceed the threshold for the low load decision in the state that the time elapsed is stored in all the slots, the execution of the processing B is resumed. At the time T4, the processing B is executed and the execution of the processing C is resumed, since the load evaluation value does not exceed the threshold for the low load decision in the state that the time elapsed is stored in all the slots.

In this manner, a load control is performed in accordance with a delay of the time elapsed DT, thereby ensuring a real-time operating ability of periodic processes.

FIG. 11 is a view of a periodic process load control system according to a more detailed embodiment of the present invention, which is implemented in the computer system shown in FIG. 1.

As shown in FIG. 11, the periodic process load control system comprises: a timer interruption generating unit 40 for generating hardware interruptions at regular intervals of time; a CPU 50 for receiving interruption signals of the hardware interruptions generated from the timer interruption generating unit 40; an event processing portion 60 activated when the CPU 50 receives the interruption signals; a periodic process 70 activated upon receipt of a timer event from the event processing portion 60; a real time clock 80; a memory area VRAM 90; a CRT display 102 for displaying the contents of the VRAM 90; and TSS processes A and B which are provided independent of the periodic process 70.

The periodic process 70 comprises: an object shift computing module 71; an object plotting image generating module 72; an object plotting image transfer module 73; a load control portion 74; and an image buffer 75. The functions of the respective modules will be described later. The load control portion 74 includes a load decision portion 74A and a decision result processing portion 74B. The load decision portion 74A includes a time storage 741 for storing the previous time, and a ten slots 742_1 to 742_10. The object plotting image transfer module 73 includes a run flag 731.

The event processing portion 60, the periodic process 70 and the TSS processes A and B are concerned with a software and exist on memories which are dealt with by the CPU 50.

The combination of the timer interruption generating unit 40, the event processing portion 60 and the CPU 50 which causes the event processing portion 60 to run in response to the timer interruption corresponds to the activation event generation unit referred to in the present invention. The periodic process 70, the object plotting image transfer module 73 and the load control portion 74 correspond to the periodic process, the soft real time process unit and the load control unit referred to in the present invention, respectively.

The timer interruption generating unit 40 is a hardware interruption generating unit for periodically generating interruption signals. When the CPU 50 receives the interruption signal from the timer interruption generating unit 40, the CPU 50 informs the event processing portion 60 of the fact that the timer interruption occurred. Upon receipt of a notification of occurrence of the timer interruption, the event processing portion 60 issues a timer event to a process (in this case the periodic process 70) which is in the state of waiting the timer event and activates the process.

The periodic process 70 is responsive to the timer event issued from the event processing portion 60 and starts the running. In the periodic process 70, the object shift computing module 71, the object plotting image generating module 72, the object plotting image transfer module 73 and the load control portion 74 run in the named order. This is a period of processing. The object shift computing module 71 serves to mainly perform coordinate calculations as to a shift of objects. The object plotting image generating module 72 writes a plotting image into the image buffer 75 on the basis of a result of the calculation of the object shift computing module 71. The object plotting image transfer module 73 transfers the plotting image made up in the image buffer 75 to the VRAM 90. When the plotting image is transferred to the VRAM 90, the plotting image is displayed on the display screen 102a of the CRT display 102.

The object plotting image transfer module 73 occupies a hardware bus over a long time for transmitting the plotting image made up in the image buffer 75. Such an occupation is large in an occupation ratio of a period of running time. However, an omission of the object plotting image transfer module 73 has no effect on the internal condition of the periodic process 70. Thus, the run flag 731 is prepared so as to allow a selection between running and no running. When the run flag 731 turns-on, the object plotting image transfer module 73 runs. When the run flag 731 turns-off, the object plotting image transfer module 73 does not run. The run flag 731 turns-on in the initial state.

In the load control portion 74, first, the processing of the load decision portion 74A is executed, and evaluates a difference between the current time derived from the real time clock 80 and the previous time held in the time storage 741. The evaluated time elapsed is saved in slots. One time interval is stored in one slot. According to the present embodiment, there are provided ten slots, so that the past ten times of time intervals may be held. In the decision result processing portion 74B, when it is decided that the load is the high load, the decision result processing portion 74B causes the run flag 731 of the object plotting image transfer module 73 to turn-off. On the other hand, when it is decided that the load is the low load, the decision result processing portion 74B causes the run flag 731 to turn-on. Thereafter, a period of process is terminated in its execution, and there is provided a waiting state until the subsequent timer event arrives.

Now, it is assumed that an interval of generation of the timer events is set up to 100 msec. Under this condition, each of ten slots 742_1 to 742_10 stores 100 (msec). Thus, the addition value (load average) is 1000 (msec). On the other hand, it is assumed that a reference value for the low load is given by 1010 (msec), and a reference value for the high load is given also by 1010 (msec). That is, the high load or the low load is decided according as the load evaluation value exceeds 1010 or not. Here, further it is assumed that in circumstances wherein the periodic process 70 and the TSS processes A and B as well run, the periodic process 70 causes dynamic images to be displayed on the display screen 102a of the CRT display 102 so that a ball travels at uniform rate from the left to the right on the display screen 102a, where a travelling of the ball is completed in ten seconds if a period is not disturbed.

FIG. 12 is a typical illustration showing changes of an image in time displayed on the display screen 102a of the CRT display 102 in the event that no disturbance occurs in the running period. FIG. 13 is a typical illustration showing changes of an image displayed, in the event that the load control portion 74 is not operated in spite of an occurrence of disturbance in the running period, that is, corresponding to the prior art embodiment. FIG. 14 is a typical illustration showing changes of an image displayed, in the event that a disturbance occurs in the running period and the load control portion 74 is operated, that is, in case of the present embodiment. In FIG. 14, the blank areas imply time zones in which the periodic process 70 including the object plotting image transfer module 73 runs, and the shaded portions imply time zones in which the periodic process 70 but the object plotting image transfer module 73 runs.

If the loads of the TSS processes A and B are of such a degree of one that they involve no occurrence of disturbance of periods, as shown in FIG. 12, the display in travelling of the ball is completed in ten seconds. In the event that the load control portion 74 is not operated, if the loads of the TSS processes A and B are of such a degree of one that they involve an occurrence of disturbance of periods, as shown in FIG. 13, the display in travelling of the ball is completed in over ten seconds. In the event that the load control portion 74 is operated, as shown in FIG. 14, while it happens that a display looks as if a travelling of the ball stops in halfway, a delay is reduced in extent as compared with that in FIG. 13.

Incidentally, according to the above-mentioned embodiment, the run flag having the binary values, that is, the turn-on and turn-off only, is used and runnings of the specified modules (soft real-time processes) are carried out or omitted in accordance with the turn-on and turn-off of the run flag. However, it is acceptable that there are set up multivalued run levels and runnings of processings different in a degree of load are carried out in accordance with the multivalued run levels. The processing different in a degree of load implies, for example, such a processing that in the object plotting image transfer module 73 the overall plotting image of the image buffer 75 is transferred to the VRAM 90, or a rough image every other pixel is transferred so that a load is reduced at the sacrifice of a resolution of images. Alternatively, it is acceptable that while the overall plotting image is transferred, frequency of a transfer of the image, such as a transfer every period, a transfer every other period, or a transfer every third period, is varied in accordance with the run levels. In the event that frequency of a transfer of the image is varied, it is possible to ease affected displays such that contents of display do not change over a number of periods.

As described above, according to the present invention, it is possible to ease damages of a real-time operating ability of processes for processing, for example, video information which is high in time-dependency, by means of detecting and controlling load conditions of periodic processes in multiple-process operating systems by time sharing systems. Particularly, the effect of the present invention is emphasized when the present invention is applied to multi-media processes which continuously operate in computers for a long time such as several hours, or several thousand hours.

While the present invention has been described with reference to the particular illustrative embodiments, it is not to be restricted by those embodiments but only by the appended claims. It is to be appreciated that those skilled in the art can change or modify the embodiments without departing from the scope and spirit-of the present invention.

We claim:

1. A periodic process load control system for controlling a load of a CPU in conjunction with an execution of a periodic process in a multiple-process operating system having the CPU in which a plurality of processes including a periodic process activated periodically are executed on a time division basis, said periodic process load control system comprising:

an activation event generation unit for periodically generating events to activate said periodic process, wherein said periodic process comprises: a soft real time process portion capable of performing a selection of execution and omission of processings, a selective execution among a plurality of processings different in load, or a selection of frequency of an execution of processings; and a load control portion operative whenever the event occurs in which a time interval between a previous operating time and a current operating time is measured to evaluate a load evaluation value consisting of an accumulation value of a plurality of past time intervals, for instructing said soft real time process portion to perform the selection of execution and omission of processings, the selective execution of a specified processing among the plurality of processings, or the selection of frequency of an execution of processings, in accordance with the load evaluation value.

2. A periodic process load control system according to claim 1, wherein said load control portion compares the load evaluation value with a threshold value, and instructs said soft real time process portion to perform the selection of execution and omission of processings, the selective execution of a specified processing among the plurality of processings, or the selection of frequency of an execution of processings, in accordance with a comparison result, and said periodic process load control system further comprises a threshold input unit for optionally inputting the threshold value.

3. A periodic process load control system according to claim 1, wherein said load control portion has a plurality of slots each for storing the accumulation value of the plurality of past time intervals evaluated by said load control portion, and an addition value of the accumulation values stored in the plurality of slots is used as the load evaluation value.

4. A periodic process load control system according to claim 3, further comprising a slot condition input unit for optionally inputting a number of the slots, and/or a number of pieces of time elapsed constituting the accumulation value stored in a single slot.

5. A periodic process recording medium for storing a periodic process periodically repeatedly executed, wherein said periodic process comprises: a soft real time process portion capable of performing a selection of execution and omission of processings, a selective execution among a plurality of processings different in load, or a selection of frequency of an execution of processings; and a load control portion operative whenever the event occurs in which a time interval between a previous operating time and a current operating time-is measured to evaluate a load evaluation value consisting of an accumulation value of a plurality of past time intervals, for instructing said soft real time process portion to perform the selection of execution and omission of processings, the selective execution of a specified processing among the plurality of processings, or the selection of frequency of an execution of processings, in accordance with the load evaluation value.

* * * * *

UNITED STATES PATENT AND TRADEMARK OFFICE
CERTIFICATE OF CORRECTION

PATENT NO. : 5,794,036
DATED : August 11, 1998
INVENTOR(S) : Gomi et al.

It is certified that error appears in the above-indentified patent and that said Letters Patent is hereby corrected as shown below:

Col. 1, line 25, change "system. if" to --system. If--.

Col. 5, line 22, change "$C_{-1}$" to --$C\_1$--.

Col. 7, line 59, change $TXDT_{MAX}X1.2$" to --$T \times DT_{MAX} \times 1.2$--;

line 60, change "where T The" to --Where T: The--.

Col. 8, line 6, change "$TxDT_{MAX}$" to --$T \times DT_{MAX}$--.

Col. 10, line 1, change "Ti" to --T1--.

Col. 11, line 66, change "an-image" to --an image--.

Col. 12, line 61, change "spirit-of" to --spirit of--.

Col. 14, line 21, change "time-is" to --time is--.

Signed and Sealed this

Twelfth Day of January, 1999

Attest:

Attesting Officer

Acting Commissioner of Patents and Trademarks